Patented Feb. 10, 1925.

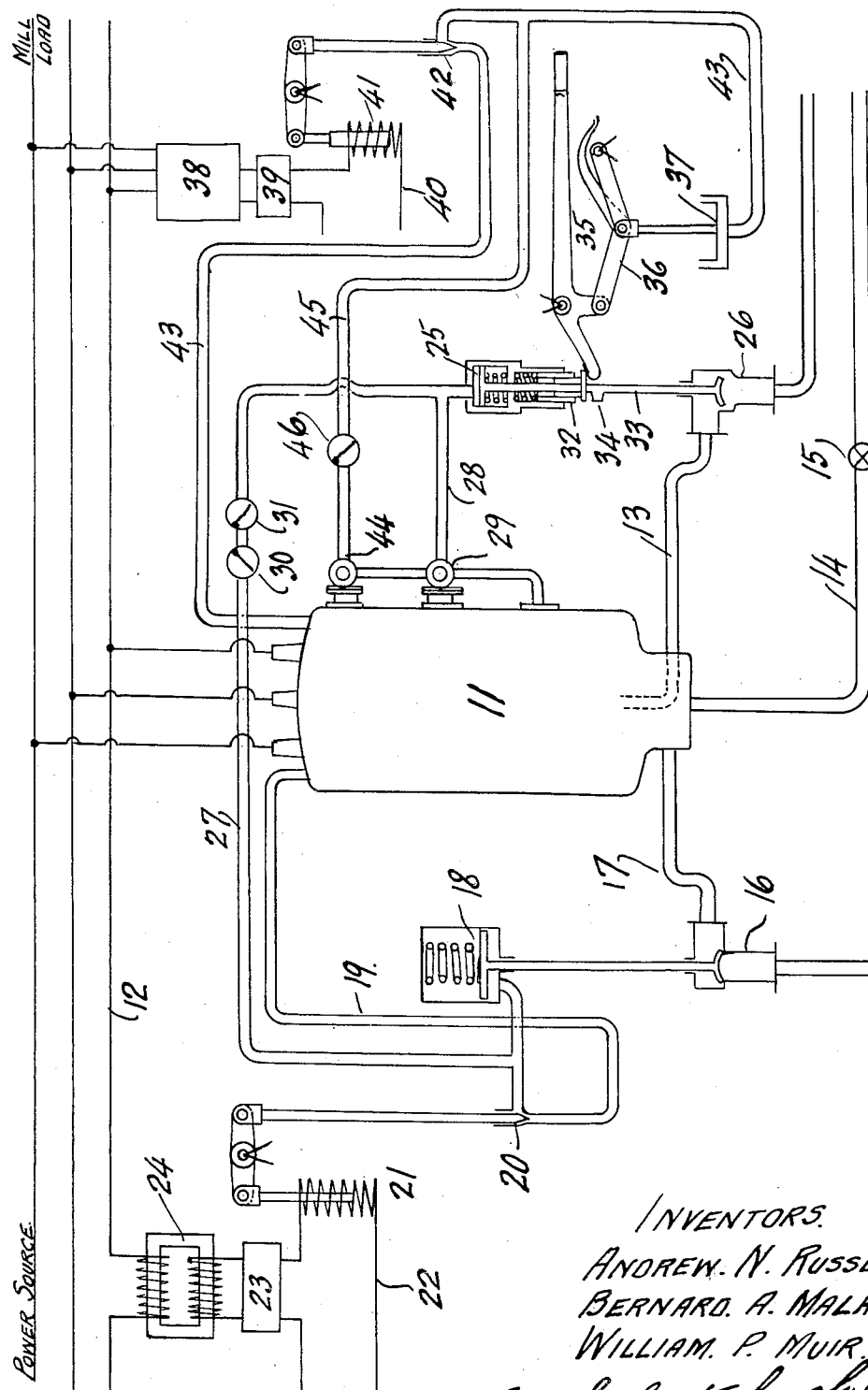

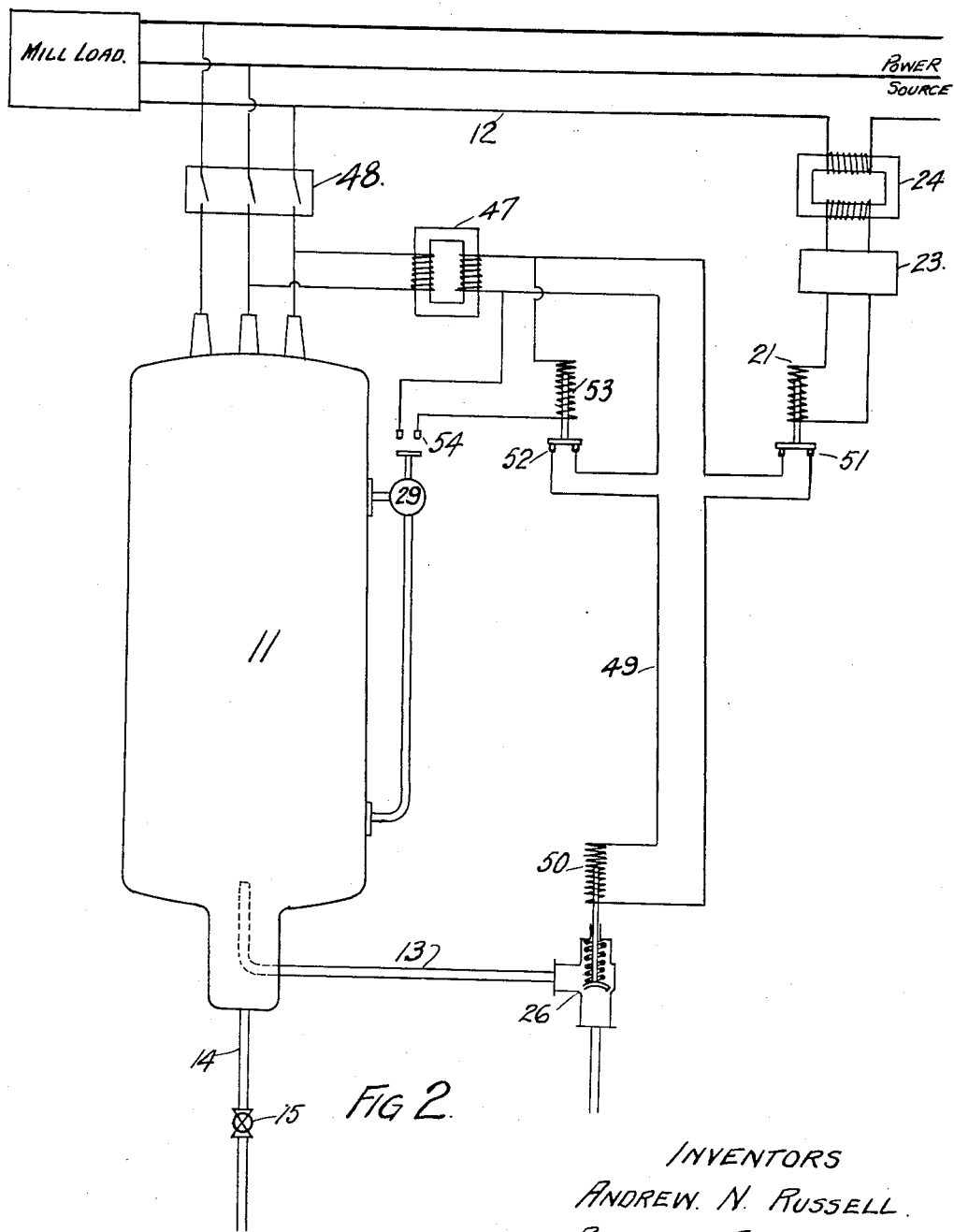

1,526,014

UNITED STATES PATENT OFFICE.

ANDREW N. RUSSELL, BERNARD A. MALKIN, AND WILLIAM P. MUIR, OF LACHINE, QUEBEC, CANADA.

METHOD OF CONTROLLING THE ELECTRIC GENERATION OF STEAM AND APPARATUS THEREFOR.

Application filed May 2, 1922. Serial No. 558,029.

*To all whom it may concern:*

Be it known that we, ANDREW N. RUSSELL, a citizen of the United States of America, BERNARD A. MALKIN, and WILLIAM P. MUIR, both subjects of the King of Great Britain, and all residents of the city of Lachine, in the Province of Quebec and Dominion of Canada, have invented certain new and useful Improvements in the Methods of Controlling the Electric Generation of Steam and Apparatus Therefor, of which the following is a full, clear, and exact description.

The electric steam generators with which this invention deals comprise electrodes submerged in water which acts as a resistance, and is heated by flow of current to a point where steam is generated. The current capacity of the generator is proportional to the submerged area of the electrodes, and as it is not convenient to move the electrodes to regulate the amount of submergence, the method resorted to has been to vary the water level. Usually water is admitted to the generator at a constant rate equal to the maximum evaporating capacity and the level, and therefore the current input and amount of evaporation are regulated by means of a controlled outflow of water.

Electric steam generators of the water resistance type are intended to be used, chiefly, as a means of utilizing surplus power which would otherwise go to waste as, for instance, during the night, or at any time where the consumer has contracted for a certain amount of power in excess of ordinary needs.

In either case there is a tendency for the generators to take the maximum amount of current for which they are designed, and in order to prevent these generators from robbing other power taking devices it is necessary to limit the power input of the generators. This is usually done by regulating the amount of submergence of the electrodes, and thereby limiting the capacity of the generator to take power. Automatic regulating devices for these generators have already been proposed, but such regulators are governed by the demand for steam, and therefore are useless to regulate the generator independently of such demand. The regulation has been effected, as aforesaid, by altering the submergence of the electrodes.

The present invention deals with the automatic regulation of these generators in accordance with the surplus of power which is available for other operations, and the object is to regulate the generator so that it will not rob other power taking devices in the plant. This regulation is effected by regulating the water level. Assuming a line having a capacity of 5,000 kw. or a consumer who has a contract for 5,000 kw. for which he must pay, regardless of the amount actually taken, it will be seen that the installation of a generator to absorb the surplus electric power and convert it into steam for heating or industrial purposes will represent an economy, even though the actual cost of thus generating the steam may be in excess of the cost of other methods of generation, because the other methods of generation will be suspended to an extent equal to the electric generation.

The electric generator which would be installed in such a plant would, naturally, be of the full capacity of the line or of the full amount of the contract, that is 5,000 kw. The nature of the generator is to take its maximum of power as long as there is a demand of steam up to the maximum output. Assuming that other devices in the plant are taking 3500 kw. it will be seen that there is a surplus of 1500 kw. available for the generator. If, however, the steam demand is in excess of the equivalent of 1500 kw. it will be seen that a generator, as ordinarily installed, would tend automatically to supply the demand for steam, and in so doing would take more than 1500 kw. thus robbing other units in the plant in the case of a limited capacity line, or exceeding the consumer's contract amount. Supposing, under such conditions, the generator took 2500 kw. it will be seen that the total load is 6000 kw. being 1000 kw. in excess of the line capacity.

According to the present invention, certain electrical equipment is provided which under the overload condition above described will initiate the operation of means to discharge water from the generator until the load in the line is normal. The invention also contemplates means to automatically empty the generator in the event of sudden cessation of current flow and to regulate inflow of water under certain conditions. For regulating the outflow of water the means comprises an electrically operated pilot valve to admit steam, or other motive fluid, to means for opening a drainage valve. The electrical equipment may take many forms, but the most satisfactory is believed to be a solenoid controlling the pilot valve and taking the current flow through a relay device operated, preferably, in connection with the main line through a transformer. The means for controlling the supply of water comprises a very similar device, having, in addition, connections permitting the level of the water in the boiler to regulate the supply.

In the accompanying drawings, Figure 1 is a diagram which illustrates one embodiment of the invention.

Figure 2 is a diagram illustrating a slightly different arrangement.

Referring more particularly to the drawings, 11 designates an electric boiler taking current from a main line 12, and supplied with water through a pipe 13, capable of supplying the maximum demand of the boiler. A drain pipe 14 is provided leading from the boiler, and having any suitable means 15 to regulate the amount of water drained from the boiler. This constitutes the usual equipment.

According to this invention there is provided a supplementary drainage valve 16 located, preferably, in an independent drainage pipe 17, and controlled in any suitable way, for example, by a spring pressed piston 18 which normally holds the valve 16 closed. The fluid pressure supply conduit 19 leads to the piston conveniently from the boiler itself and contains a controlling valve 20, which may be operated by any suitable means, such as a solenoid 21, included, preferably, in a secondary circuit 22 and controlled by a relay device 23, which is in turn controlled by overload in the line 12. A transformer 24 is, preferably, inserted between the line and the relay device for obvious reasons. The relay device is of any suitable construction which will enable it to hold the solenoid inoperative until it receives an excessive current resulting from overload in the line 12.

The operation is as follows:—

As long as the load in the line 12 is within predetermined limits, the current received by the relay device through the transformer is insufficient for its operation. When, however, there is an overload, the relay operates to close the circuit on the solenoid 21 which then draws its core and opens the valve 20 admitting steam from the boiler to the plunger 18, and moving the plunger against its load spring to open the valve 16 and cause a discharge of water from the boiler. As long as the overload condition prevails, the solenoid holds the valve 20 open, and the drain valve 16 is held open. The resulting discharge of water from the generator very soon lowers its current consumption so that the overload condition ceases. The relay may then operate to open the solenoid circuit and permit closing of the drainage valve, or the arrangement may be such that the valve requires manual closing.

While the device has been operating as previously described, the normal supply of water to the generator continues through the pipe 13. If a more rapid regulation of the generator is desired, steam may be admitted to a spring pressed plunger 25 connected to a normally open valve 26 in the pipe 13 to operate the plunger, and partially or wholly close the valve. This plunger 25 may receive steam when the valve 20 opens through a pipe 27, or may receive steam independently through a pipe 28, and suitable alarm device 29 whenever the water in the boiler reaches the normal maximum level. Preferably the load spring of the plunger 25 will return the valve 26 to open position as soon as steam pressure is excluded from the plunger. A pair of oppositely operating check valves 30 and 31 may, if desired, be included in the pipe 27, and either or both of them rendered inoperative to control the direction in which the steam will flow through the pipe, for example, if the check 30 is inoperative the valve 26 will close every time the valve 16 opens and very rapid regulation will result, but, on the other hand, the valve 16 will not operate when the valve 26 is operated by steam taken through the device 29. If the check 31 is inoperative the valve 16 will operate with the valve 26 whenever steam is passed through the device 29, but the valve 26 will not operate by steam through the valve 20. If both checks are inoperative the valves 16 and 26 will operate simultaneously under all conditions.

Generators of this class should be started up with the boiler empty and the level of water gradually raised as required, and it is, therefore, advisable to provide means for automatically emptying the boiler if the current flow in the line 12 should cease, for example, by reason of a breakdown of a generator or a break in the line itself. To accomplish this there may be provided a spring pressed sleeve slideable on the spindle 33 which connects the plunger 25 and valve 26. The spindle may be provided with a projection 34 so that it will receive motion in one direction from the sleeve. The spring pressure on the sleeve 32 should be greater than the spring pressure on the piston for the reason that the pressures are opposed. Any suitable mechanism may be provided to hold the sleeve 32 normally inoperative so that it will not interfere with the movement of the spindle by the plunger 25. Such a means may be a fulcrumed lever 35 connected to a toggle 36, the collapse of which, in one direction, is limited. The mid point of the toggle may be connected to a piston 37 so that by the application of pressure to this piston the toggle may be moved to a position in which it will be collapsed by spring pressure on the lever. In order to admit operating fluid to this piston there may be provided an arrangement similar to that provided for the valve 20 and comprising, for example, a no load or underload switch 38, arranged to operate a relay 39 included in a circuit 40 with a solenoid 41. The local circuit 40 may, if desired, be the same circuit as the local circuit 22. The solenoid may be connected to operate a valve 42 to admit steam through the pipe 43 to the piston 37.

As an adjunct, the generator may be provided with a special safety device which will operate automatically if the water in the generator reaches a dangerous level, either through the failure of the device 29 located at the normal high water level, or from any other cause. This safety device may comprise an automatic valve 44 to operate automatically when the water reaches a dangerous level, and admit steam from the boiler through the pipe 45 to the pipe 43 between the valve 42 and piston 37, so as to cause the operation of the toggle mechanism, and the positive closing of the valve 26. A check valve 46 may be included in the pipe 45 if desired. It will be observed that the difference between the two automatic devices 29 and 44 is that the former admits steam to the plunger 25 so that the valve may be partly closed and then permitted to open by spring action on the plunger, whereas the latter admits steam to effect a positive and complete closure of the valve 26 which cannot be opened except by manual operation of the levers and toggle to relieve the valve 26 of pressure imparted by the spring pressed sleeve 32.

As will be seen from the foregoing description, the essence of the invention lies in regulating an electric steam generator, according to the electric load in the means, so that the total of current taken by the generator and any other current taking device shall not exceed a predetermined amount. The regulation is applied to the generator normally by regulating the amount of water discharge, but under conditions of emergency by regulating the water supply as well. The arrangement as shown permits, also, of regulating both supply and discharge under normal conditions, but this dual regulation is not believed to be, ordinarily, necessary, and therefore, preferably, the check valve 31 is omitted or rendered inoperative so that the regulation according to line load is effected solely by discharge from the generator, while the regulation by the device 29, according to the water level, is effective on both supply and discharge. A no load condition in the line or a dangerous water level will result in a positive and complete stoppage of the water supply. If the water supply is cut off on account of dangerous water level there will, probably, also be an operation of the valve 20 under the usual overload condition, for the reason that the danger level will, probably, give a submergence of electrodes which will result in the generator taking more than the rated maximum of current.

In the diagram, Figure 2, an arrangement is illustrated which is purely electrical in its operation. A transformer 47 is connected to the supply lines of the steam generator, preferably, between the generator and the circuit breaker 48. The secondary circuit of this transformer designated 49 has connected in it a solenoid or similar device 50 operating as long as there is current flowing to hold the spring closing, feed regulating, valve 26 to some extent open. A pair of circuit breakers 51 and 52 are included in the circuit, the circuit breaker 51 being designed for operation by the solenoid or equivalent device 21 under the overload conditions already explained. For the second circuit breaker 52 there is provided an operating solenoid, or the like, designated 53, and arranged, preferably, in parallel with the solenoid 50. There is provided in circuit with the solenoid 53, a normally open circuit maker 54 operatively connected with the high water alarm device 29. Ordinarily, the circuit 49 is closed during the operation of the generator, and the feed regulating valve 26 is thereby held more or less open, the degree of opening depending, of course, upon the current flow in the secondary circuit which, in turn, depends upon the current flowing to the generator. If the main line 12 becomes overloaded the relay 23 closes the circuit of the solenoid 21 which draws up its armature and operates the circuit breaker 51 to open the secondary circuit 49, so that the solenoid 50 is de-energized and the feed valve 26 closes. In the event of water reaching the maximum normal level the alarm device 29 operates to close the circuit maker 54 and energize the solenoid 53 which operates the circuit breaker 52 to open the secondary circuit 49, with the results above described.

While this electrical arrangement has been described only in its relation to the regulation of water supply, it will be understood that it may be, also, arranged to control a normally open discharge valve, a solenoid such as 50 then normally operating to urge the discharge valve toward complete closure.

Either or both of these valves may be used as in the previously described form. It will be understood, therefore, that the invention is not limited to the particular arrangement of the electrically operating embodiment herein disclosed, but applies to all modifications thereof which fall within the scope of the appended claims.

Having thus described our invention what we claim is:—

1. A method of regulating electric steam generators, coupled with other power taking devices, on a line which comprises varying the water level of the generators inversely with fluctuations of current flow in the line, to maintain as nearly as possible a predetermined current flow in the line.

2. A mutual regulating electric steam generators, which comprises varying the water level of the generator inversely of fluctuations of current flow in the supply line relative to a predetermined current flow.

3. In an installation of current taking devices including an electric steam generator, a method of regulating the amount of current taken by the generator to the difference between a fixed amount and the amount taken by the other devices of the installation, which comprises regulating the level of water in the generator inversely of the fluctuations in the total current flowing in the line.

4. A method, according to claim 3, in which the regulation is effected by discharging water in varying amount from the generator.

5. Means for controlling electric steam generators comprising a discharge valve, and means operating automatically according to the amount of current flowing in the line serving the generator to operate said valve.

6. Means for regulating electric steam generators to take only the unrequired part of a predetermined amount of current, comprising a discharge valve, means to open and close said valve, and means to apply an actuating force to the opening and closing means, including a pilot valve and operating means therefor, and an overload device controlling said pilot valve operating means, and operatively connected in the circuit supplying the generator.

7. A method of regulating electric steam generators, which comprises discharging water therefrom inversely of the surplus of current flowing in the line and available for the generator, and independently regulating the supply of water to the generator in accordance with the fluctuations of current available for such generator.

8. Means for regulating electric steam generators, comprising a normally closed water discharge valve and a normally open water admission valve for said generator, means to open the discharge valve in an amount inversely proportional to the current available for said generator, and means to close the admission valve in an amount proportional to the current available for said generator.

9. In combination with a device according to claim 8, means to positively close the admission valve upon the accumulation of a predetermined amount of water in the generator.

10. In combination with a device according to claim 8, means to open and close the admission valve in accordance with the fluctuations of the water level.

11. In combination with a device according to claim 8, means to close the admission valve when no current is flowing in the means supplying the generator.

12. Means for regulating electric steam generators, comprising a normally closed water supply valve, electro-magnetic means normally urging said valve to open position, an electric overload device and means actuated thereby to de-energize the magnetic valve opening device.

13. Means for regulating electric steam generators, comprising a normally closed water supply valve, an electro-magnetic device normally urging said valve to open position, a supply circuit for said magnetic device including a magnetic circuit breaker in parallel with the magnetic device, the circuit of said magnetic circuit breaker being normally open, and a water level actuated circuit closer therefor.

14. In an installation of current taking devices including an electric steam generator, means for regulating the amount of current taken by the generator to the difference between a fixed amount and the amount taken by the other devices in the installation, comprising a transformer disposed in the supply mains of the installation outside all the current taking devices thereof, an electrically operated water supply valve for the generator and an overload relay device controlling said valve and operated by current from said transformer.

15. Means for controlling electric steam generators comprising a supply valve and means, operating automatically according to the amount of current flowing in the line serving the generator, to operate said valve.

16. A method of regulating electric steam generators, which comprises admitting water thereto in amount varying approximately proportionally to the amount of current available for the generator.

17. That improvement in the electric generation of steam which consists in automatically adjusting the current capacity of a generator to the amount of surplus current available in a supply line connected thereto and to other current taking devices.

18. A method of regulating the electric generation of steam which consists in utilizing the current in a supply line to automatically adjust the current capacity of the generator to the amount of surplus current available in said line.

19. A method of controlling the electric generation of steam which consists in connecting a generator to a supply line which in turn is adapted for connection to a plurality of other current taking devices having a predetermined total current capacity and utilizing the current in said line to automatically adjust the current capacity of the generator in accordance with shifting load conditions on the line so that the said generator will take only the surplus amount of current available in the line between a fixed amount and the amount consumed by the other current taking devices.

20. A method of controlling an electric generator to take only the surplus current in a supply line which consists in utilizing the current in said line to regulate the valve governing the water level in the generator, whereby the current capacity of the latter is automatically adjusted to the load on the line so as to take only the available surplus current.

In witness whereof, we have hereunto set our hands.

ANDREW N. RUSSELL.
BERNARD A. MALKIN.
WILLIAM P. MUIR.